US011316450B2

(12) United States Patent
Ikeda (10) Patent No.: US 11,316,450 B2
(45) Date of Patent: Apr. 26, 2022

(54) BRUSHLESS MOTOR AND CONTROL METHOD

(71) Applicant: Mitsuba Corporation, Gunma (JP)

(72) Inventor: Takeshi Ikeda, Kiryu (JP)

(73) Assignee: Mitsuba Corporation, Gunma (JP)

( * ) Notice: Subject to any disclaimer, the term of this patent is extended or adjusted under 35 U.S.C. 154(b) by 502 days.

(21) Appl. No.: 16/328,333

(22) PCT Filed: Aug. 28, 2017

(86) PCT No.: PCT/JP2017/030751
§ 371 (c)(1),
(2) Date: Feb. 26, 2019

(87) PCT Pub. No.: WO2018/043405
PCT Pub. Date: Mar. 8, 2018

(65) Prior Publication Data
US 2021/0281197 A1   Sep. 9, 2021

(30) Foreign Application Priority Data

Sep. 1, 2016 (JP) .............................. JP2016-170801

(51) Int. Cl.
*H02P 6/15* (2016.01)
*H02P 6/16* (2016.01)
*B60S 1/08* (2006.01)

(52) U.S. Cl.
CPC ................ *H02P 6/153* (2016.02); *H02P 6/16* (2013.01); *B60S 1/08* (2013.01)

(58) Field of Classification Search
CPC .. H02P 6/153; H02P 6/16; H02P 23/18; H02P 21/08; H02P 5/52; B60S 1/08; G05B 2219/41125

(Continued)

(56) References Cited

U.S. PATENT DOCUMENTS

| 5,752,209 A * | 5/1998 | Nishimoto ........... B62D 5/0463 |
| | | 318/434 |
| 9,219,436 B2 * | 12/2015 | Aoki ....................... H02P 6/153 |
| 2010/0176757 A1 * | 7/2010 | Yamakawa ....... H02M 7/53873 |
| | | 318/400.09 |

FOREIGN PATENT DOCUMENTS

| CN | 1211650 A | 3/1999 |
| CN | 102282755 A | 12/2011 |

(Continued)

OTHER PUBLICATIONS

European Patent Office, Search Report issued in EP 17846410.3 dated Mar. 4, 2020, 10 pages.

(Continued)

*Primary Examiner* — Jorge L Carrasquillo
(74) *Attorney, Agent, or Firm* — Wood Herron & Evans LLP (57) ABSTRACT

A brushless motor includes: a stator having a three-phase winding; a rotor that has a permanent magnet; an inverter that supplies an AC current to the three-phase wiring by turning on or turning off a plurality of switching elements; and a control part that controls an ON or OFF state of the plurality of switching elements by switching a power distribution pattern that represents a change of a power distribution state of each phase of the three-phase wiring in response to a rotation of the rotor to a low-speed power distribution pattern in use for a low-speed power distribution control or a high-speed power distribution pattern in use for a high-speed power distribution control, wherein the control part switches the power distribution pattern to the low-speed power distribution pattern in a case where a rotation speed of the rotor is less than a predetermined threshold value, and the control part switches the power distribution pattern to the high-speed power distribution pattern when a state in which a load of the rotor is within a predetermined range is (Continued)

continued for a predetermined period of time in a case where the rotation speed of the rotor is equal to or more than the threshold value.

3 Claims, 7 Drawing Sheets

(58) Field of Classification Search
USPC .................................................. 318/400.14
See application file for complete search history.

(56) References Cited

FOREIGN PATENT DOCUMENTS

| CN | 102324882 | A |   | 1/2012 |
|----|-----------|---|---|--------|
| CN | 106105012 | A |   | 11/2016 |
| EP | 0716499   | A1 |  | 6/1996 |
| JP | 2001352780 | A | * | 12/2001 |
| JP | 2002142496 | A |   | 5/2002 |
| JP | 2002233183 | A |   | 8/2002 |
| JP | 2003111469 | A |   | 4/2003 |
| JP | 3574046   | B |   | 10/2004 |
| JP | 2009100526 | A |   | 5/2009 |
| JP | 2015168273 | A |   | 9/2015 |
| WO | 2016104328 | A1 |  | 6/2016 |

OTHER PUBLICATIONS

European Patent Office, Search Report issued in EP 17846410.3 dated Mar. 6, 2020, 10 pages.
PCT Office, International Search Report issued in PCT/JP2017/030751 dated Nov. 7, 2017, 4 pages.
Chinese Patent Office, Office Action issued in CN 201780035456.3 dated Jul. 2, 2021.
Chinese Patent Office, Notice of Allowance issued in CN 201780035456.3 dated Jan. 25, 2022.

* cited by examiner

BRUSHLESS MOTOR AND CONTROL METHOD

TECHNICAL FIELD

The present invention relates to a brushless motor and a control method.

Priority is claimed on Japanese Patent Application No. 2016-170801 filed on Sep. 1, 2016, the contents of which are incorporated herein by reference.

BACKGROUND

In a brushless motor, a position and a rotation speed of a rotor are detected by a position detection unit such as a Hall sensor, and an advanced angle and a power distribution angle of a power distribution waveform with respect to a stator are controlled.

The advanced angle corresponds to a difference that is represented by an electric angle between a position that is detected by the position detection unit and a position at which a power distribution state is changed. The power distribution angle is a period of time which is represented by an electric angle and in which the same power distribution state is continued. A timing at which the power distribution state is changed is calculated in accordance with the position and the rotation speed that are detected based on an output of the position detection unit. That is, in a control of the advanced angle and the power distribution angle, the advanced angle and the power distribution angle are controlled based on a timing that is estimated in response to a past detection result.

However, when a load variation is large, there may be a case in which the estimation accuracy of the timing is degraded, and a sufficient drive torque is not obtained (for example, Patent Document 1). Regarding this, in a motor control apparatus described in Patent Document 1, with respect to a case in which the load variation is large at the time of a low-speed rotation, the problem of the reduction of the drive torque due to the degradation of the estimation accuracy is solved by the following configuration. That is, in the motor control apparatus described in Patent Document 1, depending on the rotation speed, by switching between an ordinary advanced angle control and a control which reduces the amplitude of the difference between the position that is detected by the position detection unit and the position at which the power distribution state is changed, the problem of the reduction of the drive torque due to the load variation at the time of the low-speed rotation is solved.

RELATED ART DOCUMENTS

Patent Documents

[Patent Document 1] Japanese Unexamined Patent Application, First Publication No. 2002-142496

SUMMARY OF INVENTION

Problems to be Solved by the Invention

In the motor control apparatus described in Patent Document 1, depending on the rotation speed of the rotor, the ordinary advanced angle control and the control which reduces the amplitude of the difference described above are switched. That is, when the rotation speed is less than a predetermined rotation speed, the control which reduces the amplitude of the difference is selected, and when the rotation speed is equal to or more than the predetermined rotation speed, the ordinary advanced angle control is selected. However, when the range of the rotation speed in which the load variation occurs is greatly changed by an external condition, it becomes difficult to appropriately set the predetermined rotation speed which is a threshold value of the determination condition.

That is, when the threshold value of the determination condition is set to be high, it is conceivable that the range in which the ordinary advanced angle control becomes effective is limited, and a sufficient operation property is not obtained. On the other hand, when the threshold value of the determination condition is set to be low, it is conceivable that, when a load is large and the like, a sufficient estimation accuracy is not obtained, and, for example, a motor stop and restart are repeated.

An object of an aspect of the present invention is to provide a brushless motor and a control method capable of appropriately switching between a low-speed control and a high-speed control.

Means for Solving the Problem

A brushless motor according to an aspect of the present invention includes: a stator having a three-phase winding; a rotor that has a permanent magnet and that is rotated in a state of facing the stator; an inverter that has a plurality of switching elements and that supplies an AC current to the three-phase wiring by turning on or turning off the plurality of switching elements; and a control part that controls an ON or OFF state of the plurality of switching elements by switching a power distribution pattern that represents a change of a power distribution state of each phase of the three-phase wiring in response to a rotation of the rotor to a low-speed power distribution pattern in use for a low-speed power distribution control or a high-speed power distribution control, wherein the control part switches the power distribution pattern to the low-speed power distribution pattern in a case where a rotation speed of the rotor is less than a predetermined threshold value, and the control part switches the power distribution pattern to the high-speed power distribution pattern when a state in which a load of the rotor is within a predetermined range is continued for a predetermined period of time in a case where the rotation speed of the rotor is equal to or more than the threshold value.

In the above brushless motor, the control part may control a duty ratio to be equal to or less than a predetermined limit value by using a pulse width modulation such that a rotation speed of the rotor becomes a predetermined target value when controlling the plurality of switching elements to be in an ON or OFF state, and the control part may determine that a load of the rotor is in a state within the predetermined range when the duty ratio for allowing the rotation speed of the rotor to be the target value is less than the limit value.

The above brushless motor may include a position detection part that detects a rotation position of the rotor, wherein the low-speed power distribution pattern may change the power distribution state of each phase immediately at a timing when an output signal of the position detection part is changed, the high-speed power distribution pattern may change the power distribution state of each phase at a timing that is shifted by a predetermined period of time which is varied in response to the rotation speed from the timing when the output signal of the position detection part is changed, and a power distribution angle in the high-speed power distribution pattern may be larger than a power distribution angle in the low-speed power distribution pattern.

A control method according to another aspect of the present invention includes: using a brushless motor that includes: a stator having a three-phase winding; a rotor that has a permanent magnet and that is rotated in a state of facing the stator; an inverter that has a plurality of switching elements and that supplies an AC current to the three-phase wiring by turning on or turning off the plurality of switching elements; and a control part that controls an ON or OFF state of the plurality of switching elements by switching a power distribution pattern that represents a change of a power distribution state of each phase of the three-phase wiring in response to a rotation of the rotor to a low-speed power distribution pattern in use for a low-speed power distribution control or a high-speed power distribution pattern in use for a high-speed power distribution control, the method including: by way of the control part, switching the power distribution pattern to the low-speed power distribution pattern in a case where a rotation speed of the rotor is less than a predetermined threshold value; and switching the power distribution pattern to the high-speed power distribution pattern when a state in which a load of the rotor is within a predetermined range is continued for a predetermined period of time in a case where the rotation speed of the rotor is equal to or more than the threshold value.

Advantage of the Invention

According to an aspect of the present invention, it is possible to appropriately switch between a low-speed control and a high-speed control.

DESCRIPTION OF THE EMBODIMENTS

Figure 1:
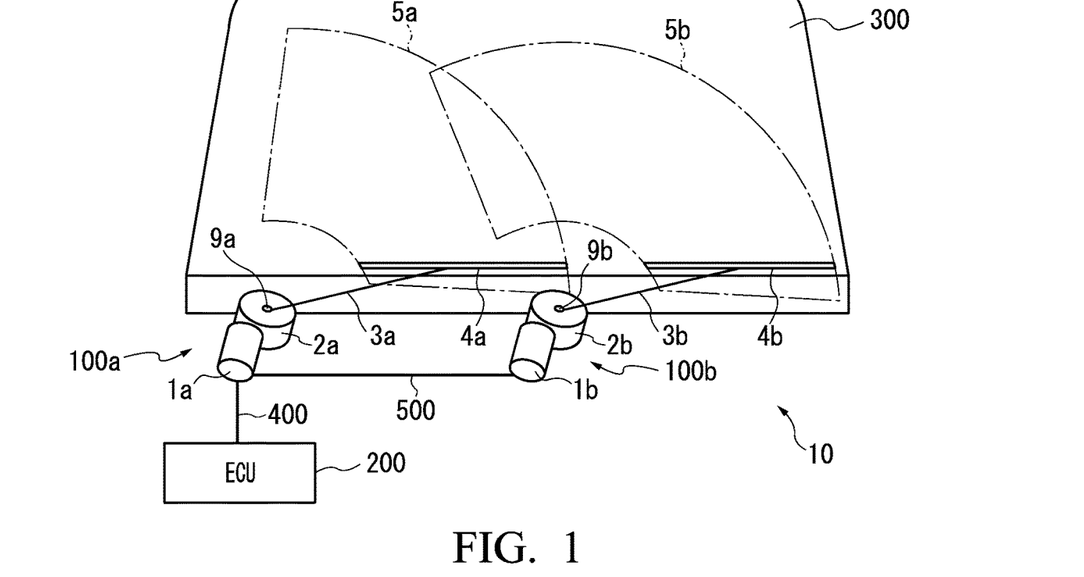
FIG. 1 is a schematic view showing a wiper apparatus according to an embodiment of the present invention.

Hereinafter, an embodiment of the present invention is described with reference to the drawings. FIG. 1 is a schematic view showing an entire configuration of a wiper apparatus 10 according to an embodiment of the present invention. The wiper apparatus 10 shown in FIG. 1 has a wiper arm 3a on a driver seat side and a wiper arm 3b on a passenger seat side that are provided swingably on a vehicle body. A wiper blade 4a on a driver seat side is attached to the wiper arm 3a on the driver seat side. A wiper blade 4b on a passenger seat side is attached to the wiper arm 3b on the passenger seat side. The wiper blade 4a is in contact with a windshield 300 in a state of being pressed to the windshield 300 by a spring member (not shown) or the like that is provided inside the wiper arm 3a. The wiper blade 4b is in contact with the windshield 300 in a state of being pressed to the windshield 300 by a spring member (not shown) or the like that is provided inside the wiper arm 3b. Two wiper shafts (a wiper shaft 9a and a wiper shaft 9b) are provided on the vehicle body. A base end part of the wiper arm 3a is attached to the wiper shaft 9a. A base end part of the wiper arm 3b is attached to the wiper shaft 9b.

Two motor apparatuses (a motor apparatus 100a and a motor apparatus 100b) are provided on the wiper apparatus 10. The motor apparatus 100a allows the wiper arm 3a to perform a swing movement. The motor apparatus 100b allows the wiper arm 3b to perform a swing movement. By the wiper apparatus 10 performing normal and reverse rotation controls of the two motor apparatuses 100a, 100b while synchronizing the two motor apparatuses 100a, 100b with each other, the wiper blade 4a performs a swing movement in a wiped range 5a indicated by a chain line, and the wiper blade 4b performs a swing movement in a wiped range 5b indicated by a chain line. The motor apparatus 100a is constituted of a brushless motor (hereinafter, the brushless motor may be simply referred to as a motor) 1a and a speed reduction mechanism 2a. The motor apparatus 100b is constituted of a brushless motor 1b and a speed reduction mechanism 2b. The brushless motor 1a is connected via an in-vehicle LAN (Local Area Network) 400 to an ECU 200 which is a controller on a vehicle side. Switch information such as ON/OFF, Lo, Hi, and INT (intermittent operation) of a wiper switch, engine start information, vehicle speed information, and the like are input via the in-vehicle LAN 400 from the ECU 200 to the brushless motor 1a. The brushless motors 1a, 1b are connected together by a communication line 500. In the wiper apparatus 10 shown in FIG. 1, by transmitting and receiving predetermined information via the communication line 500, the brushless motor 1a and the brushless motor 1b cooperate and control operations of the wiper blades 4a, 4b. The contents and the like of programs of the brushless motor 1a and the brushless motor 1b are partially different from each other, but it is possible to allow the basic configurations of the brushless motor 1a and the brushless motor 1b to be identical.

Figure 2:
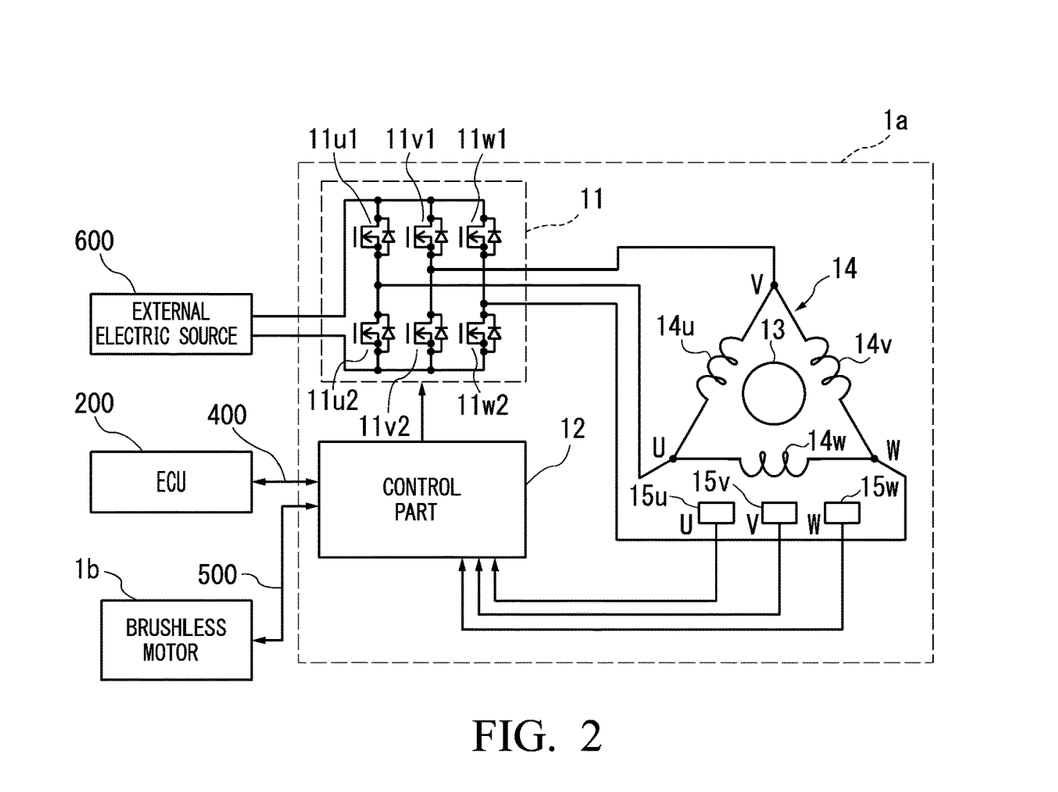
FIG. 2 is a configuration view showing a configuration example of a brushless motor shown in FIG. 1.

Next, a configuration example of the brushless motor 1a shown in FIG. 1 is described with reference to FIG. 2. The brushless motor 1a includes an inverter 11, a control part 12, a rotor 13, a stator 14, and Hall sensors 15u, 15v, 15w.

The stator 14 has a stator core (not shown) and wirings 14u, 14v, 14w that are wound around a plurality of slots included in the stator core. The wirings 14u, 14v, 14w are a three-phase wiring in a delta connection. The wire connection method is not limited to the delta connection and may be a star connection.

The rotor 13 has a permanent magnet and is rotated in a state of facing the stator 14. The rotor 13 may be arranged on the inner side of the stator 14 to form an inner rotor structure. The rotor 13 may be arranged on the outer side of the stator 14 to form an outer rotor structure. The structures of the rotor 13 and the stator 14 are not limited and can be, for example, a four-pole six-slot structure in which the number of poles of a permanent magnet consisting of a north pole and a south pole is four, and the number of slots of the stator 14 is six.

The Hall sensors (position detection part) 15u, 15v, 15w detect a rotation position of the rotor 13 by using a Hall element and output a detected result. Each of the Hall sensors 15u, 15v, 15w detects each of positions that are displaced by an electric angle of 120° from one another. The Hall sensors 15*u*, 15*v*, 15*w* output, to the control part 12, for example, a digital signal obtained by converting an analog signal having an amplitude that is proportional to a generated magnetic field by using the Hall element into a high level (H level) signal or a low level (L level) signal by a comparator. In the present embodiment, the Hall sensor 15*u* outputs a digital signal that corresponds to a U-phase, the Hall sensor 15*v* outputs a digital signal that corresponds to a V-phase, and the Hall sensor 15*w* outputs a digital signal that corresponds to a W-phase. The Hall sensors 15*u*, 15*v*, 15*w* of the present embodiment are arranged relative to the rotor 13 such that an electric angle becomes an advanced angle of 30° when the output of the inverter 11 is changed immediately at each position where an output signal level of the Hall sensor 15*u*, 15*v*, 15*w* is changed, that is, at each position where an edge is generated at the output signal.

The inverter 11 has a plurality of switching elements 11*u*1, 11*u*2, 11*v*1, 11*v*2, 11*w*1, 11*w*2. The inverter 11 turns on or turns off the plurality of switching elements 11*u*1, 11*u*2, 11*v*1, 11*v*2, 11*w*1, 11*w*2 with a predetermined combination by using an external electric source 600 as a DC electric source and thereby supplies an AC current to the wirings 14*u*, 14*v*, 14*w* as the three-phase wiring. The external electric source 600 includes, for example, a battery, a capacitor, and the like that are mounted on a vehicle. In the example shown in FIG. 2, the six switching elements 11*u*1, 11*u*2, 11*v*1, 11*v*2, 11*w*1, 11*w*2 are constituted of an n-channel MOSFET (metal-oxide semiconductor field-effect transistor). Drains of the switching elements 11*u*1, 11*v*1, 11*w*1 are commonly connected to a positive pole of the external electric source 600. A source of the switching element 11*u*1 is connected to a connection terminal (referred to as a U-phase terminal) between the wiring 14*u* and the wiring 14*w* and a drain of the switching element 11*u*2. A source of the switching element 11*v*1 is connected to a connection terminal (referred to as a V-phase terminal) between the wiring 14*v* and the wiring 14*u* and a drain of the switching element 11*v*2. A source of the switching element 11*w*1 is connected to a connection terminal (referred to as a W-phase terminal) between the wiring 14*w* and the wiring 14*v* and a drain of the switching element 11*w*2. Sources of the switching elements 11*u*2, 11*v*2, 11*w*2 are commonly connected to a negative pole (for example, an earth terminal) of the external electric source 600. The turn-on or turn-off operation of the switching elements 11*u*1, 11*u*2, 11*v*1, 11*v*2, 11*w*1, 11*w*2 is controlled by the control part 12.

The control part 12 includes, for example, a microcomputer including a CPU (central processing unit), a RAM (random-access memory), a ROM (read-only memory), and the like and peripheral circuitry of the microcomputer and controls the switching elements 11*u*1, 11*u*2, 11*v*1, 11*v*2, 11*w*1, 11*w*2. Further, the control part 12 transmits and receives predetermined information between the ECU 200 and the brushless motor 1b. Further, the control part 12 switches a power distribution pattern that represents a change of a power distribution state of the wirings 14*u*, 14*v*, 14*w* of each phase of the three-phase wiring in response to the rotation of the rotor 13 to a low-speed power distribution pattern in use for a low-speed power distribution control or a high-speed power distribution pattern in use for a high-speed power distribution control and controls an ON or OFF state of the plurality of switching elements 11*u*1, 11*u*2, 11*v*1, 11*v*2, 11*w*1, 11*w*2. Further, when controlling the plurality of switching elements 11*u*1, 11*u*2, 11*v*1, 11*v*2, 11*w*1, 11*w*2 to be in the ON or OFF state, the control part 12 controls a duty ratio (also referred to as a Duty output value) of each constant cycle to be in a predetermined limit value (also referred to as a Duty Limit value) or less by using a PWM (pulse width modulation) such that the rotation speed (also referred to as a motor speed) of the rotor 13 becomes a predetermined target value. Here, the control in a predetermined limit value or less is a control for providing an upper limit for a value of a current that flows through the wirings 14*u*, 14*v*, 14*w*, and the limit value is changed depending on the rotation speed of the rotor 13, a voltage value of the external electric source 600, an ambient temperature, and the like. By setting this limit value, the wiper apparatus 10 including the motor apparatus 100*a* is protected. The duty ratio is a value obtained by dividing an ON time by a summation value of the ON time and an OFF time in one cycle of the PWM.

Figure 3:
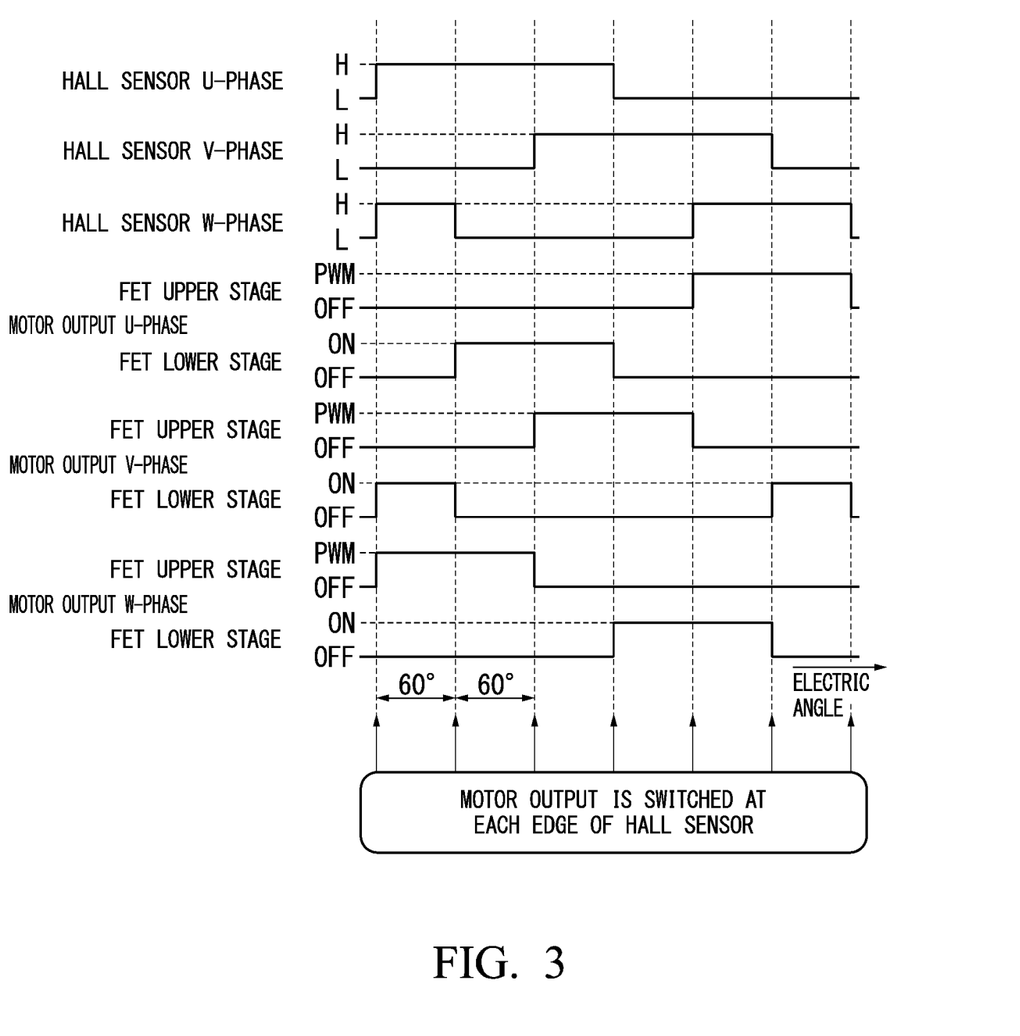
FIG. 3 is a schematic view showing an operation example of the brushless motor shown in FIG. 2.
Figure 4:
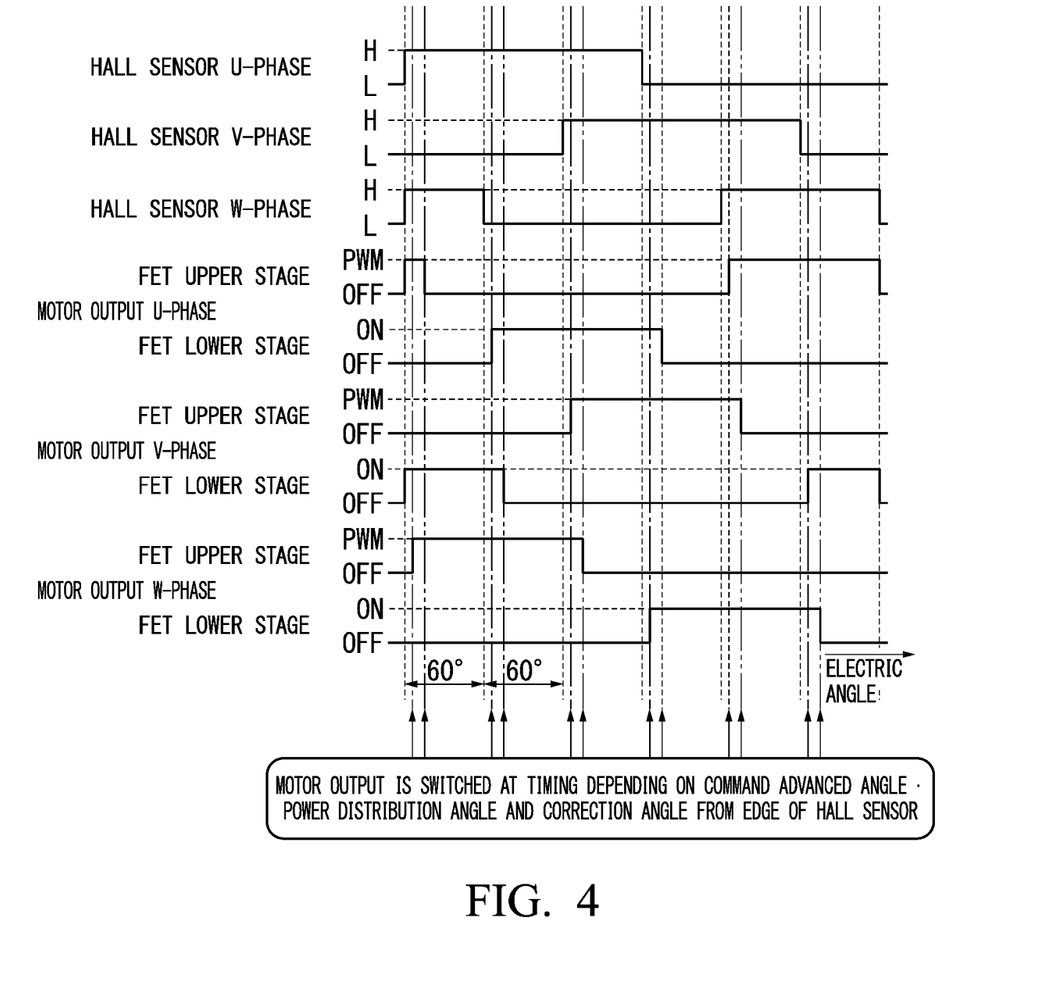
FIG. 4 is a schematic view showing an operation example of the brushless motor shown in FIG. 2.

With reference to FIG. 3 and FIG. 4, an example of the low-speed power distribution pattern in use for the low-speed power distribution control and an example of the high-speed power distribution pattern in use for the high-speed power distribution control are described. FIG. 3 shows the low-speed power distribution pattern in use for the low-speed power distribution control. FIG. 4 shows the high-speed power distribution pattern in use for the high-speed power distribution control. FIG. 3 and FIG. 4 use the horizontal axis for an electric angle and show an output signal of the Hall sensor 15*u* (Hall sensor U-phase), an output signal of the Hall sensor 15*v* (Hall sensor V-phase), an output signal of the Hall sensor 15*w* (Hall sensor W-phase), a power distribution state of the switching element 11*u*1 (motor output U-phase (FET upper stage)), a power distribution state of the switching element 11*u*2 (motor output U-phase (FET lower stage)), a power distribution state of the switching element 11*v*1 (motor output V-phase (FET upper stage)), a power distribution state of the switching element 11*v*2 (motor output V-phase (FET lower stage)), a power distribution state of the switching element 11*w*1 (motor output W-phase (FET upper stage)), and a power distribution state of the switching element 11*w*2 (motor output W-phase (FET lower stage)) in this order from the upside. The power distribution state may be any of "ON", "OFF", and a control state of the duty ratio by the PWM.

In the low-speed power distribution pattern in use for the low-speed power distribution control shown in FIG. 3, for example, in a zone at the left end having an electric angle of 60°, the output signal of the Hall sensor 15*u* (Hall sensor U-phase) represents "H", the output signal of the Hall sensor 15*v* (Hall sensor V-phase) represents "L", and the output signal of the Hall sensor 15*w* (Hall sensor W-phase) represents "H", and in this case, the switching element 11*v*2 (motor output V-phase (FET lower stage)) represents "ON", the switching element 11*w*1 (motor output W-phase (FET upper stage)) represents "PWM control", and the other switching elements represent "OFF". Further, for example, in the next zone having an electric angle of 60°, the output signal of the Hall sensor 15*u* (Hall sensor U-phase) represents "H", the output signal of the Hall sensor 15*v* (Hall sensor V-phase) represents "L", and the output signal of the Hall sensor 15*w* (Hall sensor W-phase) represents "L", and in this case, the switching element 11*u*2 (motor output U-phase (FET lower stage)) represents "ON", the switching element 11*w*1 (motor output W-phase (FET upper stage)) represents "PWM control", and the other switching elements represent "OFF". In this way, in the low-speed power distribution pattern in use for the low-speed power distribution control shown in FIG. 3, when any of the output signal of the Hall sensor 15*u* (Hall sensor U-phase), the output signal of the Hall sensor 15*v* (Hall sensor V-phase), and the output signal of the Hall sensor 15w (Hall sensor W-phase) is changed, the power distribution state of each phase is immediately changed by the control part 12. In this case, at each time when an edge (a rising edge or a falling edge) is generated at any of the Hall sensors 15u, 15v, 15w, the motor output (that is, the output from the inverter 11 to the wirings 14u, 14v, 14w) is switched. In the low-speed power distribution pattern in use for the low-speed power distribution control shown in FIG. 3, the advanced angle is 30°, and the power distribution angle is 120°.

On the other hand, in the high-speed power distribution pattern in use for the high-speed power distribution control shown in FIG. 4, the motor output is not switched at each time when an edge is generated at any of the Hall sensors 15u, 15v, 15w, and the control part 12 switches the motor output at a timing (time) depending on a correction angle, a command advanced angle, and a command power distribution angle of the Hall sensors 15u, 15v, 15w and the current rotation speed of the rotor 13 from the edge. Here, it is possible to calculate the rotation speed of the rotor 13 from the cycle of the output change of the Hall sensors 15u, 15v, 15w. The correction angle of the Hall sensors 15u, 15v, 15w is learning information for correcting the individual difference and, for example, can be calculated by measuring the deviation of the output change of the three Hall sensors 15u, 15v, 15w. In the high-speed power distribution pattern, for example, the command advanced angle can be 20°, and the command power distribution angle can be 130° or the like. When the advanced angle is 20°, the advanced angle is decreased compared to a case in which the advanced angle is 30°, and thereby, it is possible to increase the rotation speed. When the power distribution angle is 130°, the power distribution angle is increased compared to a case in which the power distribution angle is 120°, and thereby, it is possible to increase a drive torque. In the high-speed power distribution pattern, the control part 12 changes the power distribution state of each phase at a timing that is shifted by a predetermined period of time which is varied in response to the rotation speed of the rotor 13 from the timing when the output signal of the Hall sensor 15u, 15v, 15w is changed. Further, the control part 12 can allow the power distribution angle in the high-speed power distribution pattern to be larger than the power distribution angle in the low-speed power distribution pattern.

Figure 5:
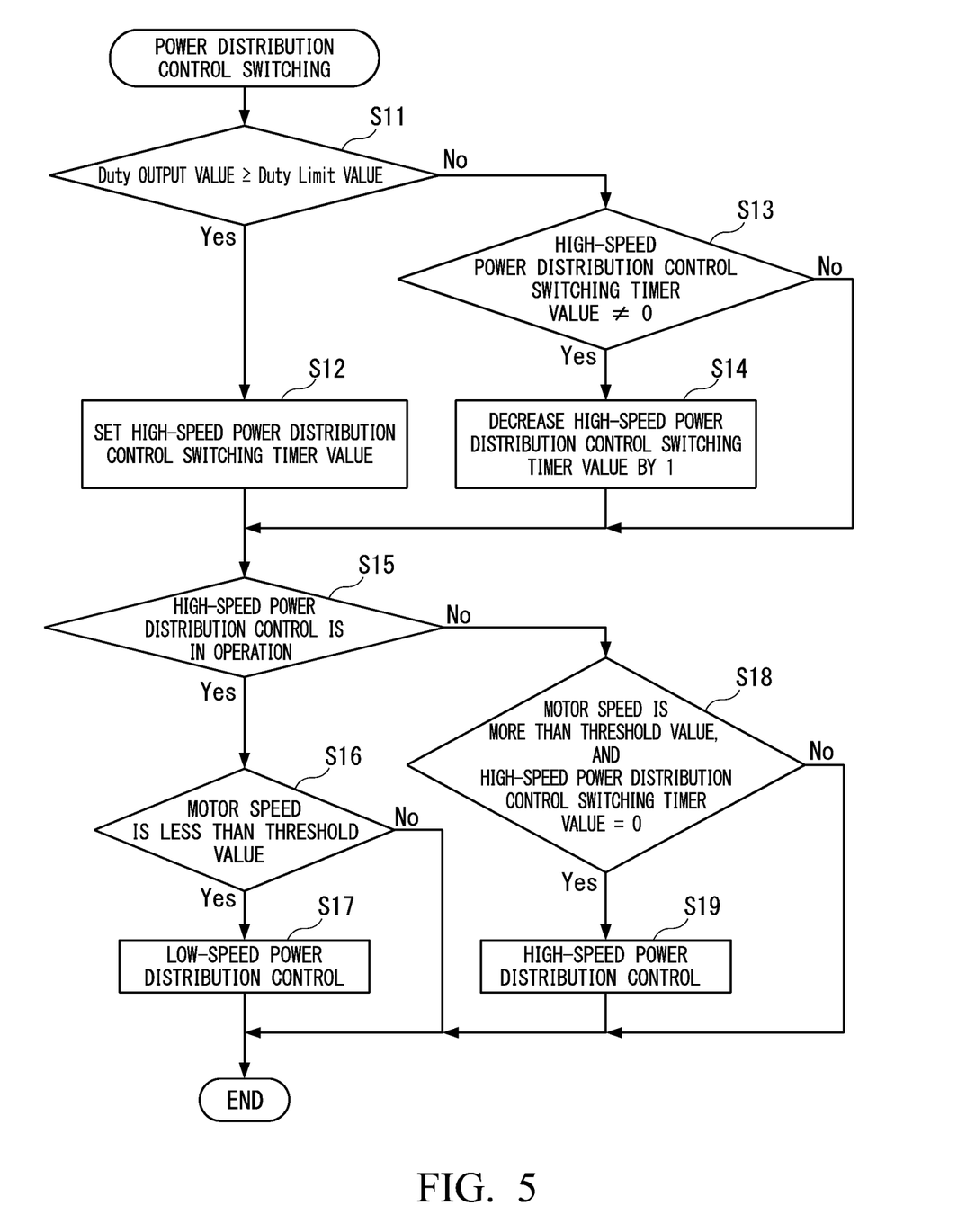
FIG. 5 is a flowchart showing an operation example of a control part shown in FIG. 2.

Next, with reference to FIG. 5, a switching operation between the low-speed power distribution control and the high-speed power distribution control by the control part 12 is described. FIG. 5 is a flowchart showing an example of a power distribution control switching operation by the control part 12. The control part 12 repeatedly performs a process shown in FIG. 5, for example, at a constant cycle after the operation is started. The control part 12 constantly selects the low-speed power distribution control when the operation is started.

First, the control part 12 determines whether or not the Duty output value is equal to or more than the Duty Limit value (Step S11). As described above, the Duty output value is a command value of a duty ratio that is calculated on the basis of the target rotation speed and the latest motor speed (rotation speed of the rotor 13), and the Duty Limit value is a limit value that is provided for protecting the wiper apparatus 10 including the motor apparatus 100a. When the Duty output value exceeds the Duty Limit value, the Duty output value is limited to the Duty Limit value. The Duty output value being large means that the deviation between an actual rotation speed and the target rotation speed is large. The Duty output value being continuously set to the Duty Limit value means a state in which a load torque is large. Accordingly, by the determination process of Step S11, the control part 12 determines whether or not the state is a state within a predetermined range in which the load torque of the rotor 13 is relatively low.

For example, it is possible to set the Duty Limit value as described below. That is, first, the control part 12 calculates the Duty Limit value used as a reference for reducing the current that flows through the wirings 14u, 14v, 14w to be less than an allowable value on the basis of the supply voltage of the external electric source 600. Next, the control part 12 measures the ambient temperature such as a board temperature that constitutes the control part 12 and corrects the Duty Limit value used as the reference on the basis of the measurement result of the temperature. Next, the control part 12 further corrects the corrected Duty Limit value on the basis of a motor acceleration and determines a final Duty Limit value.

When the Duty output value is equal to or more than the Duty Limit value (in a case of "Yes" in Step S11), the control part 12 sets a high-speed power distribution control switching timer value to a predetermined value (Step S12). The high-speed power distribution control switching timer value is a count value used for measuring a duration time of a state in which the Duty output value is less than the Duty Limit value. When the Duty output value is less than the Duty Limit value, the value of the high-speed power distribution control switching timer value is decreased by 1 in the process of Step S14 described below, and thereby, it is possible to measure the duration time of the state in which the Duty output value is less than the Duty Limit value. A value that corresponds to a temporal margin for allowing the motor speed to be capable of being stably maintained independently of the amplitude of the load after the low-speed power distribution control is switched to the high-speed power distribution control is set to the predetermined value that is set to the high-speed power distribution control switching timer value. It is possible to determine this predetermined value, for example, by an experiment or a simulation. For example, when a round-trip cycle in a case where the wiper is operated at a high speed is about 1 second, the predetermined value is set to a value less than half of about 0.5 seconds which is a movement time of one side, and thereby, it is possible to satisfy both of the stabilization of the operation and a performance improvement effect by switching between two kinds of power distribution controls.

On the other hand, when the Duty output value is not equal to or more than the Duty Limit value (in a case of "No" in Step S11), the control part 12 determines whether or not the high-speed power distribution control switching timer value is equal to 0 (Step S13). When the high-speed power distribution control switching timer value is not equal to 0 (in a case of "Yes" in Step S13), the control part 12 decreases the high-speed power distribution control switching timer value by 1 (Step S14).

When the process of Step S12 is finished, when the process of Step S14 is finished, or when the high-speed power distribution control switching timer value is equal to 0 (in a case of "No" in Step S13), the control part 12 determines whether or not the high-speed power distribution control is in operation (Step S15). When the high-speed power distribution control is in operation (in a case of "Yes" in Step S15), the control part 12 determines whether or not the motor speed is less than a predetermined threshold value (Step S16). When the motor speed is less than the predetermined threshold value (in a case of "Yes" in Step S16), the control part 12 performs switching from the high-speed power distribution control to the low-speed power distribution control (Step S17). That is, the control part 12 switches the power distribution pattern to the low-speed power distribution pattern in use for the low-speed power distribution control described with reference to FIG. 3 in Step S17 and then finishes the process shown in FIG. 5. On the other hand, when the motor speed is not less than the predetermined threshold value (in a case of "No" in Step S16), the control part 12 finishes the process shown in FIG. 5 without performing switching from the high-speed power distribution control to the low-speed power distribution control.

On the other hand, when the high-speed power distribution control is not in operation (in a case of "No" in Step S15), the control part 12 determines whether or not the motor speed is more than the predetermined threshold value (or the predetermined threshold value or more) and the high-speed power distribution control switching timer value is equal to 0 (Step S18). When the motor speed is more than the predetermined threshold value, and the high-speed power distribution control switching timer value is equal to 0 (in a case of "Yes" in Step S18), the control part 12 performs switching from the low-speed power distribution control to the high-speed power distribution control (Step S19). That is, the control part 12 switches the power distribution pattern to the high-speed power distribution pattern in use for the high-speed power distribution control described with reference to FIG. 4 in Step S19 and then finishes the process shown in FIG. 5. On the other hand, when the motor speed is not more than the predetermined threshold value, or the high-speed power distribution control switching timer value is not equal to 0 (in a case of "No" in Step S18), the control part 12 finishes the process shown in FIG. 5 without performing switching from the low-speed power distribution control to the high-speed power distribution control.

In the operation example shown in FIG. 5, the control part 12 performs the switching process between the low-speed power distribution control and the high-speed power distribution control as described below. That is, when the high-speed power distribution control is in operation, and the motor speed is less than the predetermined threshold value, the control part 12 performs switching from the high-speed power distribution control to the low-speed power distribution control. On the other hand, when the low-speed power distribution control is in operation, the motor speed is more than the predetermined threshold value, and a state in which the Duty output value is smaller than the Duty Limit value is continued for a predetermined period of time, the control part 12 performs switching from the low-speed power distribution control to the high-speed power distribution control. In this case, the control part 12 switches the power distribution pattern to the low-speed power distribution pattern in a case where the rotation speed of the rotor 13 is less than the predetermined threshold value and switches the power distribution pattern to the high-speed power distribution pattern when a state in which the load of the rotor 13 is within a predetermined range is continued for a predetermined period of time in a case where the rotation speed of the rotor 13 is more than the threshold value (or equal to or more than the threshold value). According to this configuration, for example, when the load applied to the motor is large, and the motor speed is slow, the low-speed power distribution control can be continued without performing switching from the low-speed power distribution control to the high-speed power distribution control. Therefore, according to the brushless motors 1a, 1b of the present embodiment, it is possible to appropriately switch between the low-speed control and the high-speed control.

Next, with reference to FIG. 7, a verification result using an actual machine of the switching operation of the power distribution control described with reference to FIG. 5 is described. For comparison, an experimental result (FIG. 8) of a case (hereinafter, referred to as a comparison example) in which the switching process of the power distribution control is performed according to the flow shown in FIG. 6 is also described.

Figure 6:
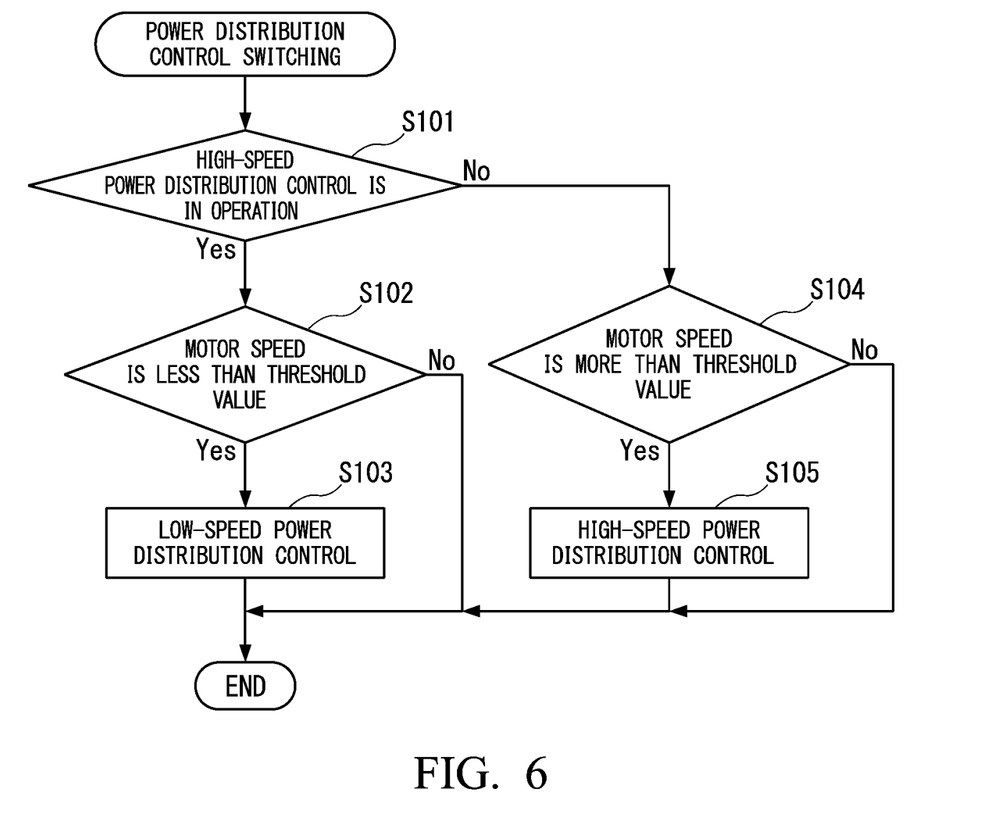
FIG. 6 is a flowchart showing an operation of a comparison example.

FIG. 6 is a flowchart showing an operation of the comparison example in which part of the operation shown in FIG. 5 is changed. In the comparison example, after the operation is started, similarly to the case of FIG. 5, the control part 12 repeatedly performs the process shown in FIG. 6 at a constant cycle. Also, in the comparison example, the control part 12 constantly selects the low-speed power distribution control when the operation is started.

In an operation example shown in FIG. 6, first, the control part 12 determines whether or not the high-speed power distribution control is in operation (Step S101). When the high-speed power distribution control is in operation (in a case of "Yes" in Step S101), the control part 12 determines whether or not the motor speed is less than a predetermined threshold value (Step S102). The threshold value used in this Step S102 and Step S104 are the same as the threshold value used in Step S16 and Step S18 of FIG. 5. When the motor speed is less than the predetermined threshold value (in a case of "Yes" in Step S102), the control part 12 performs switching to the low-speed power distribution control similarly to Step S17 of FIG. 5 (Step S103). On the other hand, when the high-speed power distribution control is not in operation (in a case of "No" in Step S101), the control part 12 determines whether or not the motor speed is more than a predetermined threshold value (Step S104). When the motor speed is more than the predetermined threshold value (in a case of "Yes" in Step S104), the control part 12 performs switching to the high-speed power distribution control similarly to Step S19 of HG. 5 (Step S105).

Figure 7:
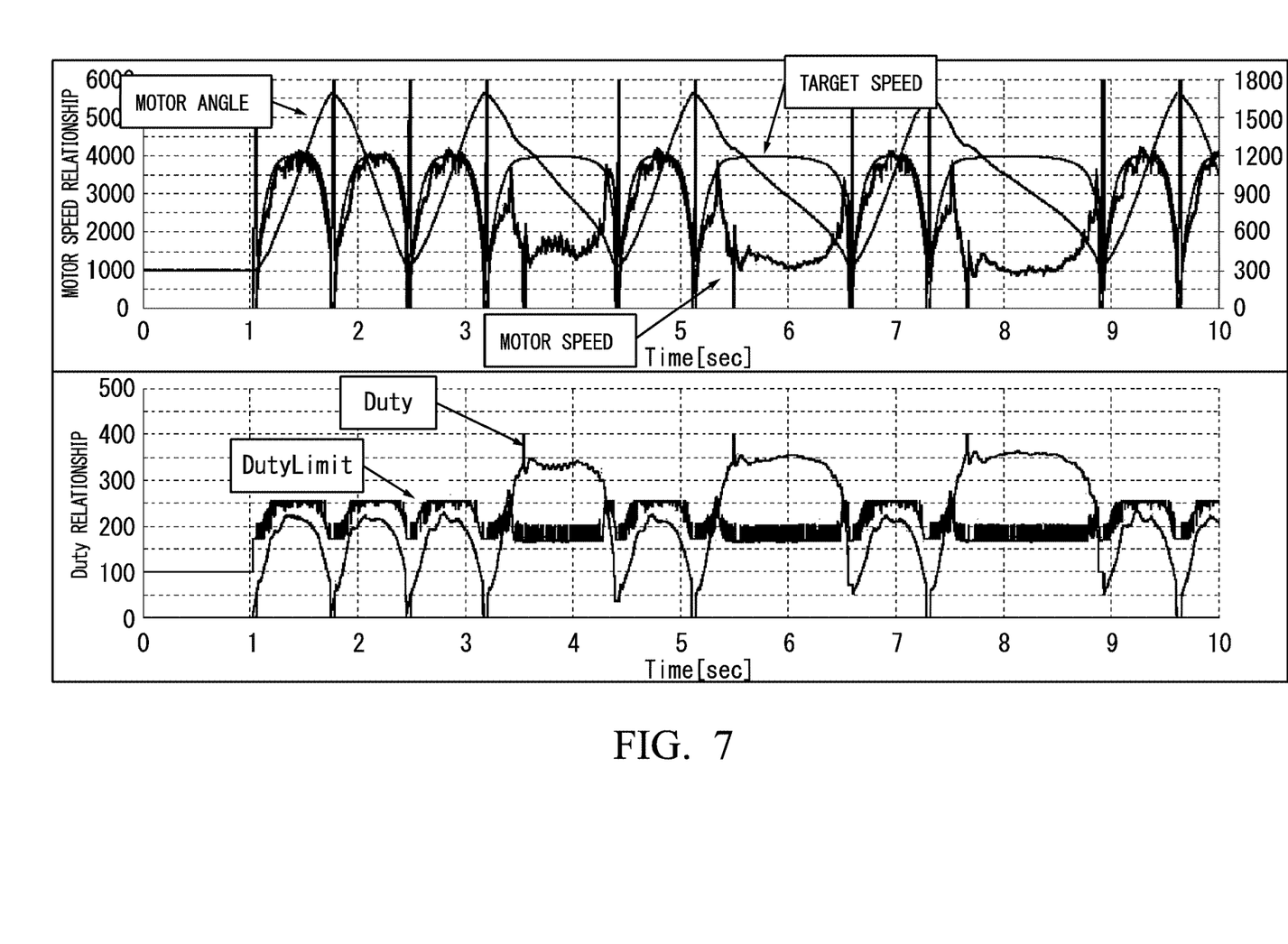
FIG. 7 is a waveform view showing an operation example of the brushless motor shown in FIG. 1.
Figure 8:
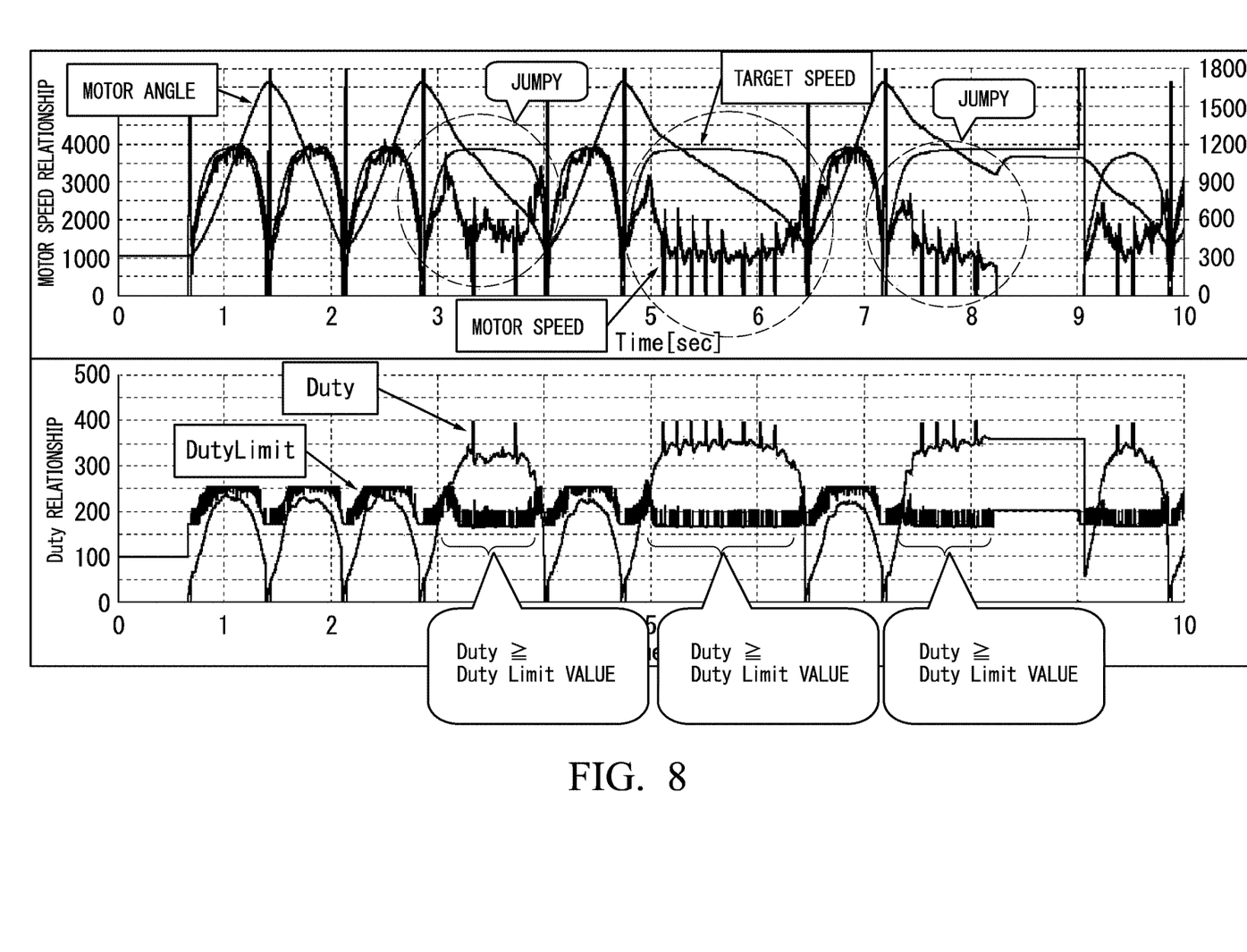
FIG. 8 is a waveform view showing an operation of the comparison example.

Next, with reference to FIG. 7 and FIG. 8, a verification result using an actual machine is described. At the time of the verification of FIG. 7 and FIG. 8, a constant high load is applied to the brushless motor 1a. The load is not a high load by which it is impossible to start the motor. FIG. 7 shows a case of the present embodiment (a case of the flow shown in FIG. 5), and FIG. 8 shows a case of the comparison example (a case of the flow shown in FIG. 6). FIG. 7 and FIG. 8 are waveform views representing a time change of the following data value in the RAM included in the control part 12. FIG. 7 and FIG. 8 use the horizontal axis for a time axis, display a motor angle (the angle of the rotor 13), a target speed, and a motor speed at the upper part, and display a Duty output value and a Duty Limit value at the lower part.

As shown in FIG. 8, in the comparison example, a motor stop and restart are repeated in a region surrounded by a chain line. This is because the following operations are repeated. That is, (1) the motor speed is rapidly decreased due to the large load applied to the motor. (2) An angle at which the motor speed is desired to be switched and a timing when the motor output is actually switched are displaced from each other, the motor characteristic is degraded, and the motor speed is further slowed (because the motor output switching timing is calculated from the motor speed). (3) The high-speed power distribution control is switched to the low-speed power distribution control due to the motor speed decrease, and the motor output is performed according to the Hall edge basis. (4) By performing the motor output according to the Hall edge basis, the motor characteristic returns, and therefore, the motor starts. (5) When the motor starts, the motor speed is present, and the power distribution control is switched to the high-speed power distribution control again. By repeating the above (1) to (5) operations, a failure operation arises.

On the other hand, as shown in FIG. 7, in a case of the switching operation of the low-speed power distribution control and the high-speed power distribution control of the present embodiment, even in a state where the load applied to the motor is high, it is possible to allow the motor to be continuously operated.

As described above, according to the embodiment of the present invention, when the load applied to the motor is large and while the motor is operated at a low speed, the power distribution control is not switched to the high-speed power distribution control for a predetermined period of time, and thereby, it is possible to prevent an unstable operation in which the low-speed power distribution control and the high-speed power distribution control are repeated. Further, the determination whether the load applied to the motor is large is performed on the basis of whether or not the Duty output value is limited, that is, whether or not the Duty output value is equal to or more than the Duty Limit value, and therefore, it is possible to easily simplify the configuration required for determining whether the load is large.

The embodiment of the present invention is not limited to the embodiment described above. For example, the above embodiment is described using a configuration in which the rotor 13, the stator 14, the inverter 11, and the control part 12 are integrally formed; however, for example, a configuration may be used in which the control part 12 is separated from the other constituents. Alternatively, a configuration may be used in which the control part 12 and the inverter 11 may be separated from the other constituents. Further, the above embodiment is described using a configuration in which two motor apparatuses 100a, 100b are provided on the wiper apparatus 10; however, the embodiment is not limited to the configuration. For example, a configuration may be used in which a single motor apparatus allows the wiper arms 3a, 3b to perform a swing movement via a link mechanism. Further, in the above embodiment, the brushless motors 1a, 1b are constituent elements of the wiper apparatus 10; however, the application field is not limited to a wiper apparatus.

DESCRIPTION OF THE REFERENCE SYMBOLS 1a, 1b brushless motor
10 wiper apparatus
100a, 100b motor apparatus
11 inverter
11u1, 11u2, 11v1, 11v2, 11w1, 11w2 switching element
12 control part
13 rotor
14 stator
14u, 14v, 14w wiring
15u, 15v, 15w Hall sensor

The invention claimed is:
1. A brushless motor, comprising:
a stator having a three-phase winding;
a rotor that has a permanent magnet and that is rotated in a state of facing the stator;
an inverter that has a plurality of switching elements and that supplies an AC current to the three-phase wiring by turning on or turning off the plurality of switching elements; and
a control part that controls an ON or OFF state of the plurality of switching elements by switching a power distribution pattern that represents a change of a power distribution state of each phase of the three-phase wiring in response to a rotation of the rotor to a low-speed power distribution pattern in use for a low-speed power distribution control or a high-speed power distribution pattern in use for a high-speed power distribution control,
wherein the control part switches the power distribution pattern to the low-speed power distribution pattern in a case where a rotation speed of the rotor is less than a predetermined threshold value, and the control part switches the power distribution pattern to the high-speed power distribution pattern when a state in which a load of the rotor is within a predetermined range is continued for a predetermined period of time in a case where the rotation speed of the rotor is equal to or more than the threshold value,
the control part controls a duty ratio to be equal to or less than a predetermined limit value by using a pulse width modulation such that a rotation speed of the rotor becomes a predetermined target value when controlling the plurality of switching elements to be in an ON or OFF state, and
the control part determines that a load of the rotor is in a state within the predetermined range when the duty ratio for allowing the rotation speed of the rotor to be the target value is less than the limit value.
2. The brushless motor according to claim 1, comprising a position detection part that detects a rotation position of the rotor,
wherein the low-speed power distribution pattern changes the power distribution state of each phase immediately at a timing when an output signal of the position detection part is changed,
the high-speed power distribution pattern changes the power distribution state of each phase at a timing that is shifted by a predetermined period of time which is varied in response to the rotation speed from the timing when the output signal of the position detection part is changed, and
a power distribution angle in the high-speed power distribution pattern is larger than a power distribution angle in the low-speed power distribution pattern.
3. A control method, comprising:
using a brushless motor that comprises:
a stator having a three-phase winding;
a rotor that has a permanent magnet and that is rotated in a state of facing the stator;
an inverter that has a plurality of switching elements and that supplies an AC current to the three-phase wiring by turning on or turning off the plurality of switching elements; and
a control part that controls an ON or OFF state of the plurality of switching elements by switching a power distribution pattern that represents a change of a power distribution state of each phase of the three-phase wiring in response to a rotation of the rotor to a low-speed power distribution pattern in use for a low-speed power distribution control or a high-speed power distribution pattern in use for a high-speed power distribution control, the method comprising:

by way of the control part, switching the power distribution pattern to the low-speed power distribution pattern in a case where a rotation speed of the rotor is less than a predetermined threshold value; and switching the power distribution pattern to the high-speed power distribution pattern when a state in which a load of the rotor is within a predetermined range is continued for a predetermined period of time in a case where the rotation speed of the rotor is equal to or more than the threshold value, the control part controls a duty ratio to be equal to or less than a predetermined limit value by using a pulse width modulation such that a rotation speed of the rotor becomes a predetermined target value when controlling the plurality of switching elements to be in an ON or OFF state, and the control part determines that a load of the rotor is in a state within the predetermined range when the duty ratio for allowing the rotation speed of the rotor to be the target value is less than the limit value.

* * * * *